(12) United States Patent
D'Alessandro

(10) Patent No.: US 7,770,954 B2
(45) Date of Patent: Aug. 10, 2010

(54) CONSOLE ASSEMBLY FOR A VEHICLE

(75) Inventor: Anthony D'Alessandro, Ray Township, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 12/235,852

(22) Filed: Sep. 23, 2008

(65) Prior Publication Data

US 2010/0072767 A1 Mar. 25, 2010

(51) Int. Cl.
*B60R 13/00* (2006.01)
(52) U.S. Cl. .................... 296/24.34; 296/37.8
(58) Field of Classification Search .............. 296/24.34, 296/37.8, 37.14, 37.1
See application file for complete search history.

(56) References Cited

U.S. PATENT DOCUMENTS

| | | | | |
|---|---|---|---|---|
| 4,809,897 A * | 3/1989 | Wright, Jr. | ............... | 224/282 |
| 5,085,481 A * | 2/1992 | Fluharty et al. | ............ | 296/37.8 |
| 6,045,173 A * | 4/2000 | Tiesler et al. | ............. | 296/37.8 |
| 6,419,314 B1 | 7/2002 | Scheerhorn | | |
| 6,435,587 B1 * | 8/2002 | Flowerday et al. | .......... | 296/37.8 |
| 6,749,079 B2 | 6/2004 | Katagiri | | |
| 6,932,402 B2 * | 8/2005 | Niwa et al. | ............. | 296/24.34 |
| 6,942,267 B1 * | 9/2005 | Sturt | ....................... | 296/24.34 |
| 7,004,527 B2 | 2/2006 | Niwa | | |
| 7,029,049 B2 * | 4/2006 | Rockafellow et al. | ....... | 296/37.8 |
| 7,278,681 B2 | 10/2007 | Lilov | | |
| 7,296,839 B2 | 11/2007 | Scheerhorn | | |
| 7,413,229 B2 * | 8/2008 | Kukucka et al. | ......... | 296/24.34 |
| 7,416,235 B2 * | 8/2008 | Rajappa et al. | ............ | 296/37.8 |
| 7,533,918 B2 * | 5/2009 | Spykerman et al. | ...... | 296/24.34 |
| 2003/0122392 A1 * | 7/2003 | Larsen et al. | ............. | 296/24.1 |
| 2008/0079278 A1 | 4/2008 | Rajappa | | |
| 2009/0058120 A1 * | 3/2009 | Ioka et al. | ................ | 296/24.34 |

\* cited by examiner

*Primary Examiner*—Kiran B. Patel
(74) *Attorney, Agent, or Firm*—Matthew B. Dernier, Esq.; Gibson & Dernier LLP

(57) ABSTRACT

A vehicle interior assembly includes: a center console having front and rear terminal ends defining a longitudinal axis; and a sliding portion slidingly engaging the rear terminal end of the console such that the sliding portion is operable to slide in frontward and rearward directions substantially parallel to the longitudinal axis of the console to cover and uncover at least one storage bin, wherein the sliding portion includes a first portion extending under the rear terminal end of the console and a second portion extending over the rear terminal end of the console to cover and uncover the at least one storage bin.

17 Claims, 6 Drawing Sheets

CONSOLE ASSEMBLY FOR A VEHICLE

FIELD OF THE INVENTION

The present invention is directed to consoles that employ sliding portions to expose and hide compartments and/or trays for storage or use in a vehicle, or the like.

BACKGROUND OF THE INVENTION

Vehicle consoles are usually located in the center of a vehicle between driver and passenger seats. The console typically employs hinged and/or sliding components for opening and closing storage bins or compartments within the console of the vehicle. The hinged component (e.g., an armrest lid) is typically attached to the console via a hinge placed on a terminal end of the lid. The lid may then pivot around the attached hinge to open and close over a storage bin. When in the open position, the lid typically lies upwards substantially transverse to the length of the console.

Opening or closing a hinged lid over a storage bin requires complicated arm movements by the user, which in combination with the upwards and transverse open position of the lid prevents a driver and/or passenger from enjoying an ergonomic experience when accessing the storage bin. For instance, when the hinged lid is in the open position, the hinge does not permit the lid from pivoting entirely out of the way of the user and becomes an obstacle and a distraction. Such a distraction can lead to an accident or injury. Additionally, when the hinged lid is in the upward transverse position (i.e., open), the lid occupies space that a passenger or driver would otherwise use as an armrest, thereby placing a driver or passenger in an uncomfortable position.

When employing a sliding component, such as a sliding armrest or lid, to access a storage bin, the lid is typically attached to the console via sliding rails/channels placed on each side of the lid and console. The lid may then slide along the sliding rails to open and close the storage bins. In some cases, the sliding rails may be curved so that the lid is oriented in a substantially vertical position when open, so as to mimic comparable hinged components. As with the hinged component, moving the sliding lid into the open position requires complicated arm movements by the user and results in the aforementioned ergonomic problems. Sliding components can further employ hinges, and such components also exhibit complicated arm movements and ergonomic problems.

Providing ergonomic characteristics and utilizing simpler arm movements are important for effective and comfortable user interaction. Complicated, uncomfortable movements of console components can result in inefficient operation, and can place a driver and passengers into distracting, unsafe situations, which can result in accidents, injury, or the like.

Therefore, there is a need in the art for a console assembly for providing ergonomic characteristics to a driver and or user and requiring simpler arm movements for operation.

SUMMARY OF THE INVENTION

In accordance with one or more embodiments of the present invention, a vehicle interior assembly includes: a center console having front and rear terminal ends defining a longitudinal axis; and a sliding portion slidingly engaging the rear terminal end of the console such that the sliding portion is operable to slide in frontward and rearward directions substantially parallel to the longitudinal axis of the console to cover and uncover at least one storage bin. The sliding portion may include a first portion extending under the rear terminal end of the console and a second portion extending over the rear terminal end of the console to cover and uncover the at least one storage bin.

The sliding portion may be considered substantially C-shaped when viewed perpendicular to the longitudinal axis of the console. Thus, for example, the first and second portions may be substantially parallel to one another and the sliding portion may include a third portion extending between the first and second portions.

In one or more embodiments, the second portion of the sliding portion may include an upper surface and a lower surface, where the upper surface is operable as an armrest for a passenger.

In accordance with an alternative aspect, the first portion of the sliding portion may include an upper surface and a lower surface, where the upper surface includes a tray. The tray may be integrally molded into the upper surface of the first portion. By way of example, the tray may be exposed when the sliding portion is slid in the rearward direction; and the tray may be covered by the rear terminal end of the console when the sliding portion is slid in the frontward direction.

The at least one storage bin may include at least two storage bins in longitudinal alignment. Preferably, the sliding portion is operable to cover and uncover the at least two bins in a sequential manner as a function of how far the sliding portion is slid in the frontward and rearward directions.

In one or more embodiments, a sliding drawer may be disposed on a top surface of the console and operable to slide substantially in the forward and rearward directions to expose or hide the at least one storage bin. By way of example, the at least one storage bin may be oriented within the sliding drawer to be accessed from above. Preferably, the second portion of the sliding portion extends over the rear terminal end of the console to cover and uncover the at least one storage bin of the sliding drawer.

The types of vehicles in which the present invention may be employed are numerous and include: automobiles, planes, trains, trucks, buses, boats, helicopters, submersible vehicles, spacecraft, etc.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, wherein like numerals indicate like elements, there are shown in the drawings simplified forms that may be employed, it being understood, however, that the invention is not limited by or to the precise arrangements and instrumentalities shown, but rather only by the claims. The drawings may not be to scale, and the aspects of the drawings may not be to scale relative to each other. To assist those of ordinary skill in the relevant art in making and using the subject matter hereof, reference is made to the appended drawings and figures, wherein:

DETAILED DESCRIPTION OF THE PRESENT INVENTION

Vehicle interior assemblies are disclosed herein for exposing and hiding compartments (also referred to as storage bins) and/or trays. The assemblies may be employed in automobiles, planes, trains, trucks, buses, boats, helicopters, submersible vehicles, spacecraft, or the like. In particular, the present invention relates to vehicle interior assemblies that provide desired ergonomics and ease of operation (e.g., due to less complex arm movement) of sliding portions that are adapted to expose and hide compartments and/or a tray in a console.

Figure 1:
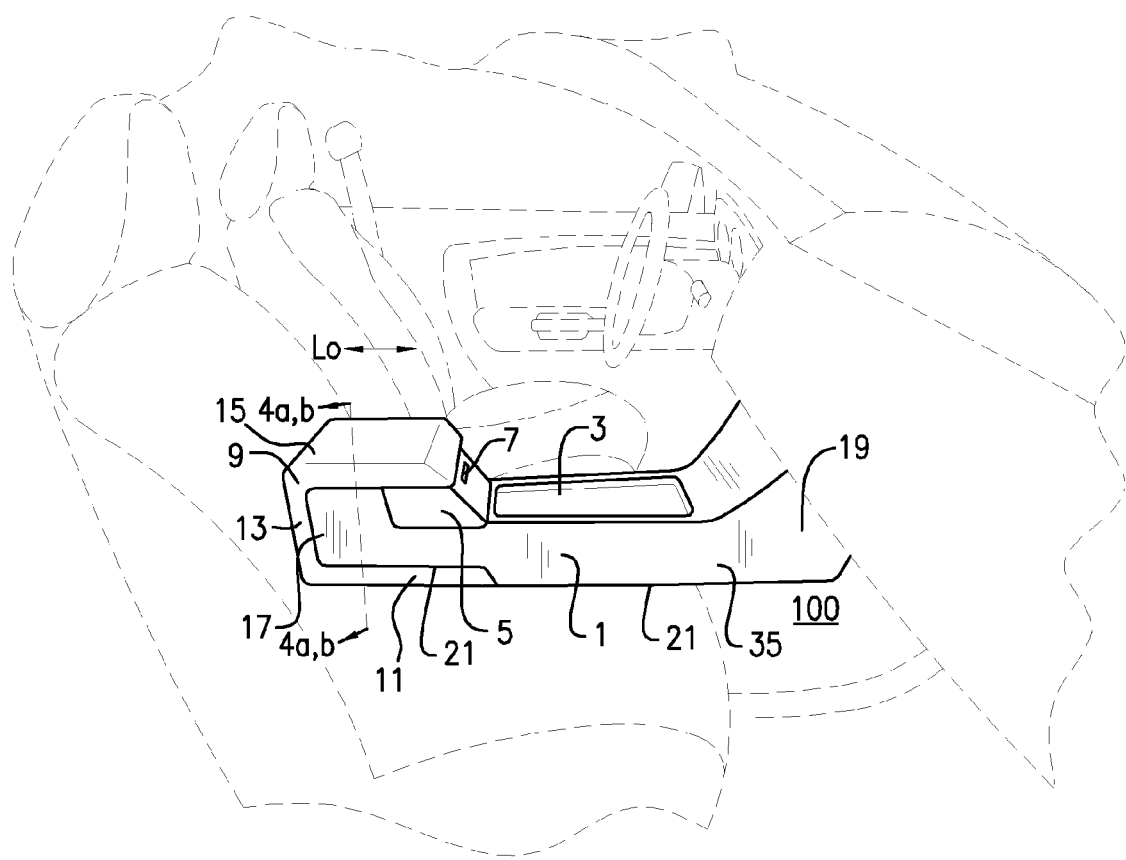
FIG. 1 is a perspective view of a vehicle interior assembly employing a center console and sliding portions in accordance with at least one aspect of the present invention.

FIG. 1 is a schematic view of a console assembly 100 in accordance with at least one aspect of the present invention. The console 1 is disposed in a vehicle adjacent to a driver's seat, and may be formed from metal, plastic, polymer, or the like. The console 1 is connected to the vehicle via rear and front terminal ends 17, 19, an underside 21, and/or a side surface 35. Those skilled in the art will recognize that any mechanism may be used to connect the console 1 to the vehicle, such as bonding, bolting, molding, clamping, or the like.

The console assembly 100 may include at least one sliding portion 5 (hereinafter referred to as a "drawer") and/or another sliding portion 9, each of which are preferably operable to expose and hide at least one compartment (or bin).

Figure 2:
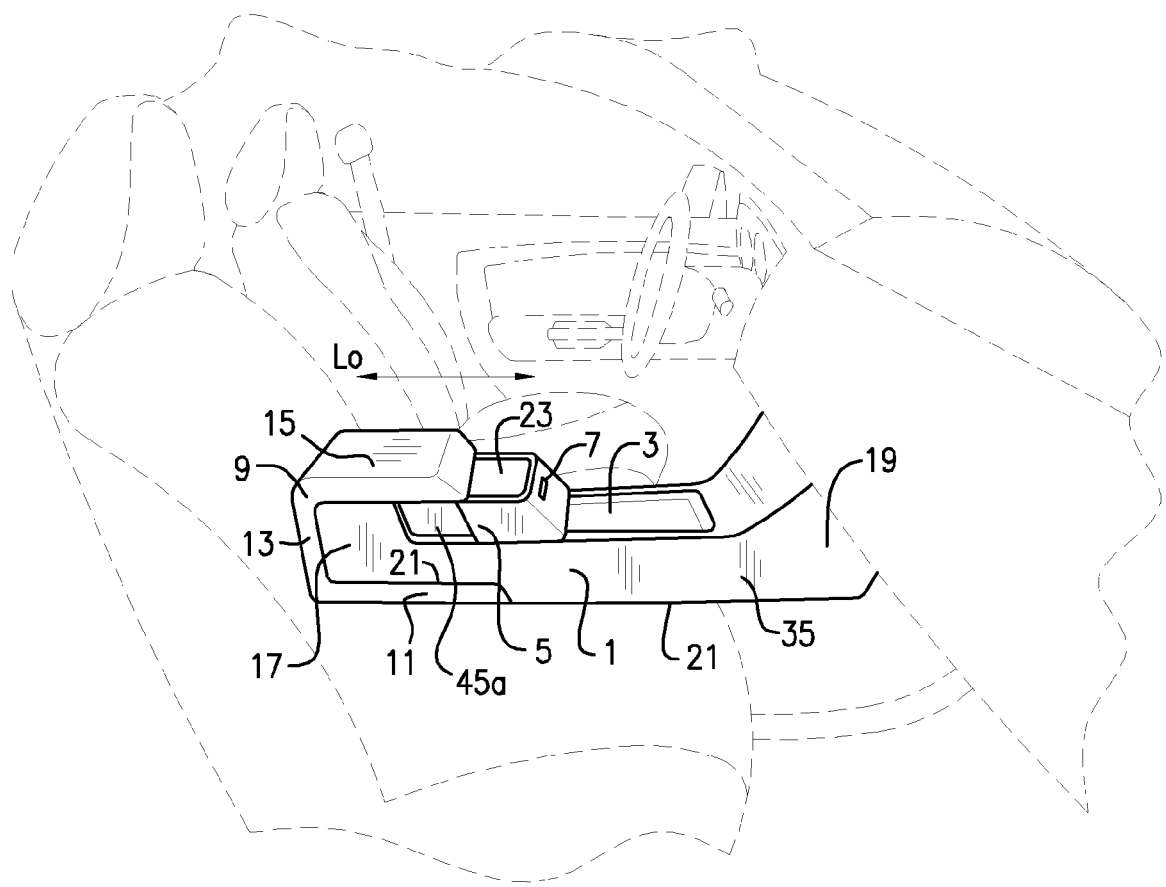
FIG. 2 is a perspective view of the vehicle interior assembly in accordance with at least one aspect of the present invention.

The drawer is disposed on a top surface 3 of the console 1. The drawer 5 is adjacent to a terminal end 17 of the console 1 when in a closed position as shown in FIG. 1. To assist in sliding the drawer 5 substantially parallel to a longitudinal axis, Lo, of the console 1, drawer 5 may include at least one handle or grip 7. A driver or passenger of the vehicle can grab grip 7 to move the drawer 5 in a first direction or in a second direction substantially parallel to the axis, Lo, to expose or hide, respectively, a compartment 23 as shown in FIG. 2 for use, storage, or the like. In some embodiments, the first direction is forwards (e.g., towards the terminal end 19 of console 1), and the second direction is backwards (e.g., towards the terminal end 17 of the console 1). The drawer 5 may be formed from metal, plastic, polymer, rubber, or the like.

Figure 3:
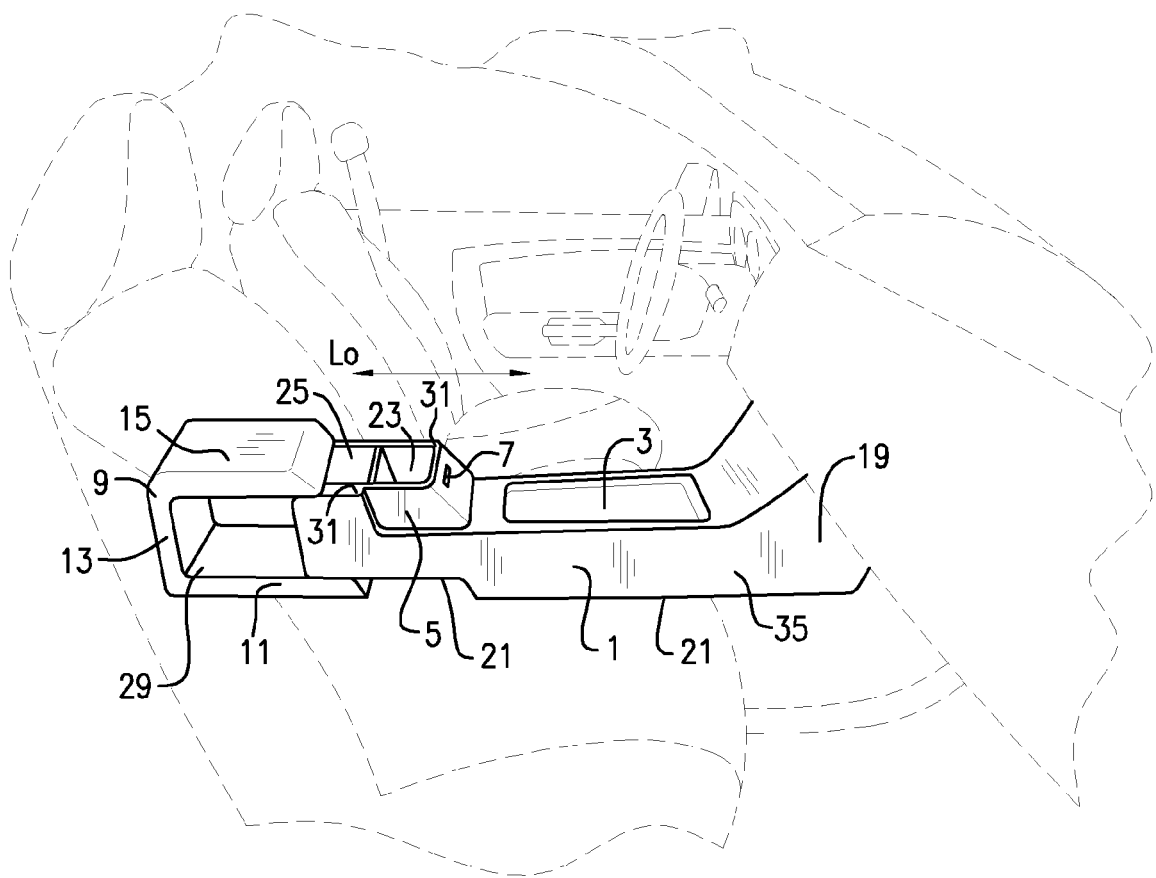
FIG. 3 is a perspective view of the vehicle interior assembly in accordance with at least another aspect of the present invention.

From the closed position as shown in FIG. 1, a driver or passenger slides, with or without the use of grip 7, the drawer 5 substantially parallel to longitudinal axis, Lo, on the top surface 3 of the console 1. As best seen in FIG. 2, the drawer 5 is in the exposed position. When in the exposed position, the drawer 5 is positioned towards terminal end 19 of console 1 and away from terminal end 17 of the console 1 so that a driver or passenger may access compartment 23 for storage. In at least one embodiment as shown in FIGS. 2-3, a driver or passenger can access the compartment 23 at a top surface 31 of the at least one sliding portion 5. When the driver or passenger is done using compartment 23, the driver or passenger slides the drawer 5 towards terminal end 17 along the top surface 3 of the console 1.

In accordance with at least one embodiment, the at least one sliding portion 5 may further include one or more extensions 45a, 45b (45a shown in FIG. 2) disposed at opposite sides of the at least one sliding portion 5. Extensions 45a, 45b are operable to slide into and out of the terminal end 17 for a predetermined distance so that the drawer 5 does not disconnect from the console 1. The extensions 45a, 45b may be operably connected to the drawer 5. Those skilled in the art will recognize that any method may be used to connect the extensions 45a, 45b to drawer 5, such as, but not limited to, bonding, bolting, molding, clamping, or the like. In some embodiments, the extensions 45a, 45b are indivisibly attached to the drawer 5 as an integral part thereof.

The other sliding portion 9 is disposed in engagement with the rear terminal end 17 of the console 1. The other sliding portion 9 mates with the terminal end 17 when in a closed position as shown in FIG. 1, and slides substantially parallel to the longitudinal axis, Lo, of the console 1. The sliding portion 9 slidingly engages the rear terminal end 17 of the console 1 such that the sliding portion 9 is operable to slide in frontward and rearward directions substantially parallel to the longitudinal axis Lo to cover and uncover the at least one storage bin 23, 25. More particularly, the sliding portion 9 preferable includes a first portion 11, a second portion 15, and a third portion 13. The first portion 11 extends under the rear terminal end 17 of the console 1 and the second portion 15 extends over the rear terminal end 17 to cover and uncover the at least one storage bin 23, 25.

In general, the sliding portion 9 is substantially C-shaped when viewed perpendicular to the longitudinal axis Lo of the console 1. Thus, the first and second portions 11, 15 are substantially parallel to one another and the sliding portion 9 includes the third portion 13 extending transversely (e.g., substantially perpendicularly) between the first and second portions 11, 15. Thus, the first portion 11 and the second portion 15 each slide rearward or frontward substantially parallel to the longitudinal axis, Lo. In the example illustrated in FIGS. 1-3, the compartments 23, 25 are in longitudinal alignment and the sliding portion 9 is operable to cover and uncover the two bins 23, 25 in a sequential manner as a function of how far the sliding portion 9 is slid in the frontward and rearward directions.

In at least one embodiment, a width of the sliding portion 9 is equal to or less than a width of the console 1 such that the sliding portion 9 does not extend beyond a side surface 35 of the console 1. In at least a further embodiment, the sliding portion 9 is wider than the console 1 and extends beyond side surface 35 of the console 1.

The sliding portion 9 may be formed from one or more of metal, plastic, polymer, rubber, or the like. The first, second, and third portions 11, 15, 13 of the sliding portion 9 may be integrally formed (such as by injection molding or the like), or they may be formed from one or more individual components connected to one another other. Those skilled in the art will recognize that any suitable art recognized mechanisms may be used to connect the portions 11, 13, 15 if they are not integrally formed, such as bonding, bolting, molding, clamping, or the like.

As best seen in FIG. 1, the first portion 11 may extend underneath the console 1, and/or the second portion 15 may extend on top of the console 1. Passengers or a driver may use an upper surface of the second portion 15 as an armrest for additional support or relaxation when occupying the vehicle.

In accordance with an aspect of the present invention, a driver or passenger of the vehicle can slide portion 15 of the sliding portion 9 in frontward and rearward directions substantially parallel to the axis, Lo, to expose or hide, respectively, the compartment 23 for use, storage, or the like. The sliding (as opposed to rotation) of second portion 15 and resultant orientation of same results in an ergonomic characteristic.

As shown in FIG. 3, the sliding portion 9 may act as a cover for at least one compartment 23, 25 when in the closed position. The sliding portion 9 may slide substantially parallel to the axis, Lo, to expose or hide the at least one compartment 23, 25 for use, storage, or the like. As aforementioned, at least one compartment 23 may be disposed within the drawer 5.

Additionally or alternatively, one or more other compartments 25 may be disposed at the terminal end 17 of the console 1. The compartment 25 may be integrally formed with the console 1. The compartment 25 may be placed adjacent to and/or behind the compartment 23 such that the compartments 23, share the same top surface 31, thereby allowing the sliding portion 9 to slide over the compartments 23, 25 on the top surface 31 for coverage. In some embodiments, the sliding portion 9 may be partially slid along top surface 31 to hide one compartment 25, while allowing the other compartment 23 to remain exposed.

Figure 4A:
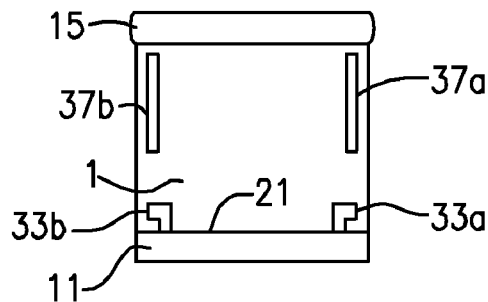
FIGS. 4a-4f are cross-sectional views of alternative sliding rail designs suitable for use on the vehicle interior assembly in accordance with various embodiments of the present invention.
Figure 4B:
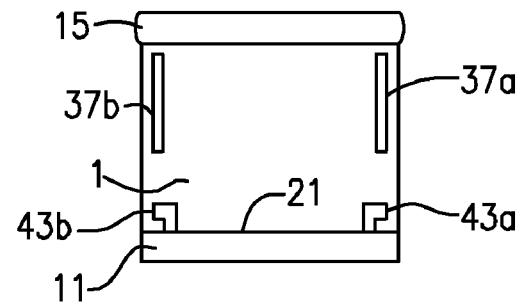

In accordance with another aspect of the present invention, the drawer 5 and the sliding portion 9 are operable to slide along at least one respective sliding rail. Referring to FIGS. 4a-4b, alternative embodiments of the respective sliding rails are illustrated in cross-section taken along cross-section 4a,b-4a,b as shown in FIG. 1.

Figure 5:
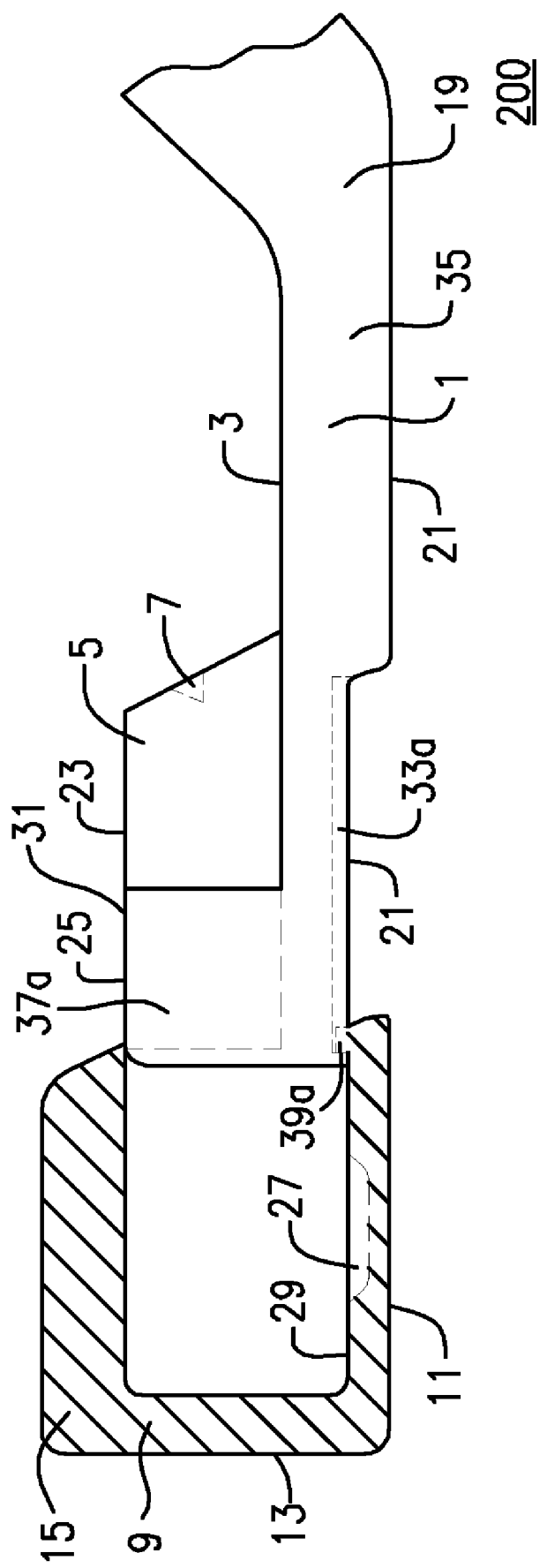
FIG. 5 is a side view of the vehicle interior assembly of FIG. 3 in accordance with at least one further aspect of the present invention.

As shown in FIGS. 4a and 4b, the terminal end 17 of the console 1 may include one or more sliding rails 37a, 37b through or on which the extensions 45a, 45b, (45a is shown in FIG. 2) of the drawer 5, respectively, can slide. Sliding rails 37a, 37b may be disposed on opposite sides of any compartment 23, 25 and within and/or on opposite walls of terminal end 17 of console 1. For example, sliding rail 37a may be positioned within terminal end 17 adjacent to side surface 35 of console 1. When the drawer 5 is in the closed position as shown in FIG. 5, extension 45a extends substantially into or on sliding rail 37a. Those skilled in the art will recognize that any method may be used to connect the extensions 45a, 45b into sliding rails 37a, 37b to prevent a detachment between extensions 45a, 45b and sliding rails 37a, 37b, such as, but not limited to, bonding, bolting, molding, clamping, tapering, or the like. Sliding rails 37a, 37b may be indivisibly attached to console 1 as an integral part thereof. Additionally or alternatively, any other method or arrangement of sliding rails known to those skilled in the art may be employed.

As shown in FIG. 5, the sliding portion 9 may include one or more sliding rail connectors 39a, 39b disposed on opposite sides of the first portion 11. As shown in FIG. 4a, sliding rails 33a, 33b may be disposed on opposite sides of the bottom surface 21 of terminal end 17 of the console 1 so that sliding rail connectors 39a, 39b may connect or extend into respective sliding rails 33a, 33b. Sliding rails 33a, 33b may extend transversely from the bottom surface 21 of console 1, and widen towards a respective side surface 35 of the console 1. Those skilled in the art will recognize that any method may be used to connect the sliding rail connectors 39a, 39b into sliding rails 33a, 33b to prevent a detachment between sliding rail connectors 39a, 39b and sliding rails 33a, 33b, such as, but not limited to, bonding, bolting, molding, clamping, tapering, or the like. Alternatively, in at least another embodiment of the present invention as shown in FIG. 4b, sliding rails 43a, 43b may extend transversely from the bottom surface 21 of console 1, and widen towards an opposite side surface 35 of the console 1. Sliding rails 33a, 33b, 43a, 43b may be indivisibly attached to console 1 as an integral part thereof. Additionally or alternatively, any other method or arrangement of sliding rails known to those skilled in the art may be employed.

In at least one alternative embodiment of the present invention as shown in FIGS. 5 and/or 6a-6b, the console assembly 200, 300 is operable to expose and hide at least one compartment 41 and a tray 27 and includes a console 2 and at least one sliding portion 9. Numbered elements of console assembly 200, 300 may share the same aforementioned characteristics of like-numbered elements of console assembly 100.

Figure 6A:
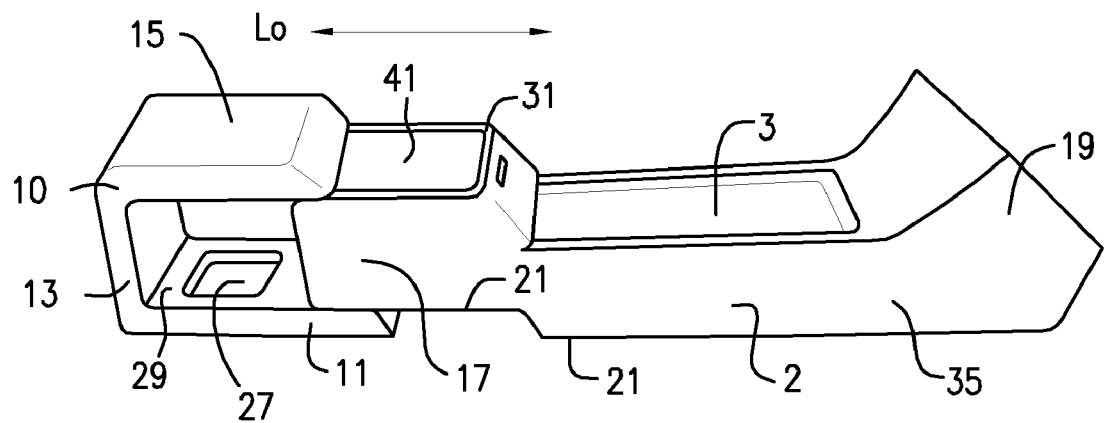
FIGS. 6a-6b are prospective and side views, respectively, of an alternate vehicle interior assembly employing a sliding portion in accordance with various embodiments of the present invention.

In at least one embodiment, the tray 27 is disposed on and/or in a top surface 29 of the first portion 11 of the sliding portion 9. The tray 27 is further positioned adjacent to the third portion 13 and underneath the second portion 15 of the sliding portion 9. Those skilled in the art will recognize that any method may be used to dispose the tray 27 onto and/or into the top surface 29 of the first portion 11 of sliding portion 9, such as, but not limited to, bonding, bolting, molding, clamping, or the like. In at least two embodiments as shown in FIGS. 5 and 6a, the tray 27 is molded into the first portion 11 as a depression originating from the top surface 29 of the sliding portion 9, and the tray 27 extends into the first portion 11 for a predetermined distance as an integral part thereof.

Because console 2 may not include the drawer 5 of the aforementioned console 1, the compartment 41 may differ from compartment 23 in that the walls of compartment 41 may not include sliding rails 37a, 37b. Additionally, as console 2 may not include the aforementioned compartment 23 of sliding portion 5, there may be additional space on the top surface 3 of console 2 to vary the size of compartment 41 depending upon a desired storage capacity. The second portion 15 of at least one sliding portion 10 may act as a cover for compartment 41. Compartment 41 may be indivisibly attached to terminal end 17 of console 2 as an integral part thereof.

Figure 4C:
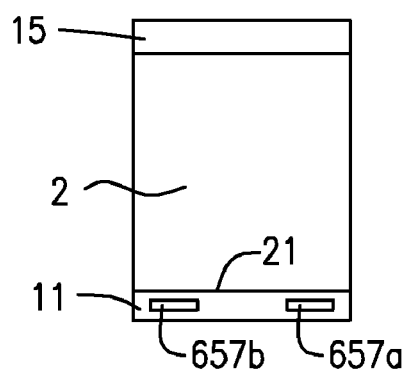
Figure 4D:
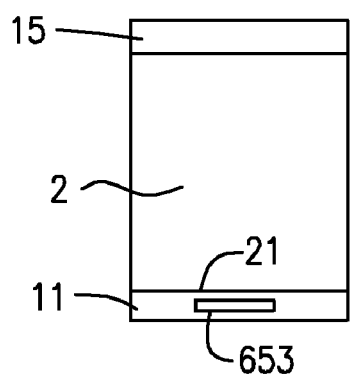
Figure 4E:
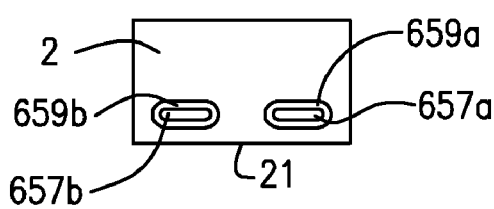
Figure 4F:
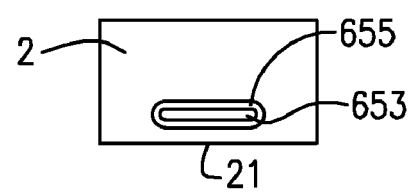
Figure 6B:
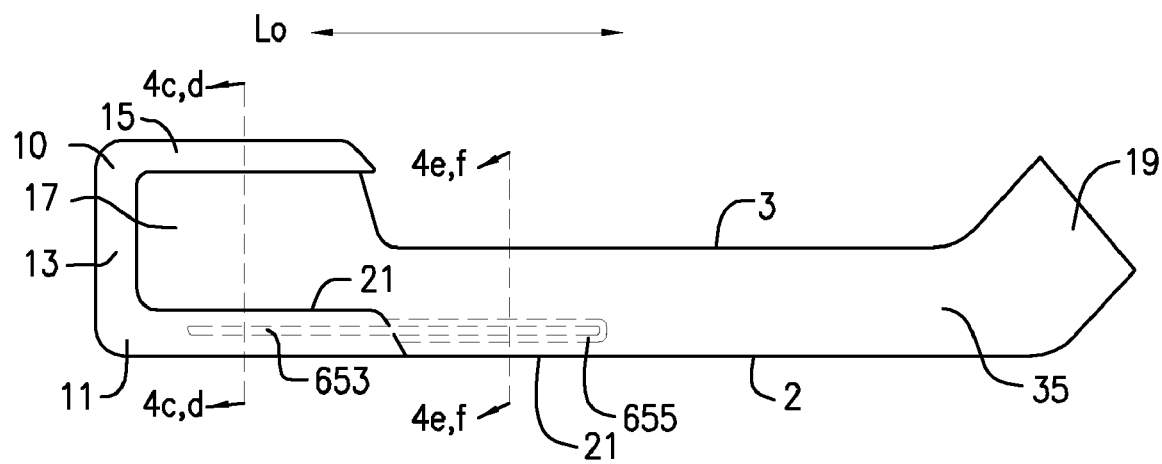

In accordance with an aspect of the present invention, the sliding portion 9 is operable to slide along at least one sliding rail. Referring to FIGS. 4c-4f, alternative embodiments of the at least one sliding rail are illustrated in cross-section. Specifically, FIGS. 4c and 4d are taken along cross-section 4c,d-4c,d while FIGS. 4e and 4f are taken along cross-section 4e,f-4e,f as shown in FIG. 6b.

As shown in FIGS. 4d and 4f, the terminal end 17 of the console 2 may include one or more sliding rails 655 through which an extension 653 of the at least one sliding portion 10 can slide. In some embodiments as shown in FIG. 6b, extension 653 may extend from inside first portion 11 of the sliding portion 10, underneath terminal end 17 of console 2, and into sliding rail 655. Sliding rail 655 may be disposed in the middle of console 2 above and adjacent to the bottom surface 21 of console 2. When sliding portion 10 is in the closed position, extension 653 extends substantially along sliding rail 655. Those skilled in the art will recognize that any method may be used to connect the extension 653 into sliding rail 655 to prevent a detachment between extension 653 and sliding rail 655, such as, but not limited to, bonding, bolting, molding, clamping, tapering, or the like. Sliding rail 655 may be indivisibly attached to console 2 as an integral part thereof.

Additionally or alternatively, any other method or arrangement of sliding rails known to those skilled in the art may be employed. For example, console 2 and sliding portion 10 may be connected by more than one sliding rail-extension pair. As shown in FIGS. 4c and 4e, extensions 657a and 657b extend from inside first portion 11 of the sliding portion 10, underneath terminal end 17 of console 2, and into sliding rails 659a, 659b, respectively. Sliding rails 659a, 659b may be disposed near the bottom surface 21 of console 2 adjacent to respective side walls 35 of console 2.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A vehicle interior assembly, comprising:
    a center console having front and rear terminal ends defining a longitudinal axis; and
    a sliding portion slidingly engaging the rear terminal end of the console such that the sliding portion is operable to slide in frontward and rearward directions substantially parallel to the longitudinal axis of the console to cover and uncover at least one storage bin,
    wherein the sliding portion includes a first portion extending under the rear terminal end of the console and a second portion extending over the rear terminal end of the console to cover and uncover the at least one storage bin.

2. The vehicle interior assembly according to claim 1, wherein the sliding portion is substantially C-shaped when viewed perpendicular to the longitudinal axis of the console.

3. The vehicle interior assembly according to claim 1, wherein the first and second portions are substantially parallel to one another and the sliding portion includes a third portion extending between the first and second portions.

4. The vehicle interior assembly according to claim 1, wherein the second portion of the sliding portion includes an upper surface and a lower surface, the upper surface being operable as an armrest for a passenger.

5. The vehicle interior assembly according to claim 1, wherein the first portion of the sliding portion includes an upper surface and a lower surface, the upper surface including a tray.

6. The vehicle interior assembly according to claim 5, wherein the tray is integrally molded into the upper surface of the first portion.

7. The vehicle interior assembly according to claim 5, wherein:
    the tray is exposed when the sliding portion is slid in the rearward direction; and
    the tray is covered by the rear terminal end of the console when the sliding portion is slid in the frontward direction.

8. The vehicle interior assembly according to claim 1, wherein:
    the at least one storage bin includes at least two storage bins in longitudinal alignment; and
    the sliding portion is operable to cover and uncover the at least two bins in a sequential manner as a function of how far the sliding portion is slid in the frontward and rearward directions.

9. The vehicle interior assembly according to claim 1, further comprising a sliding drawer disposed on a top surface of the console and operable to slide substantially in the forward and rearward directions to expose or hide the at least one storage bin.

10. The vehicle interior assembly according to claim 9, wherein the at least one storage bin is oriented within the sliding drawer to be accessed from above and the second portion of the sliding portion extends over the rear terminal end of the console to cover and uncover the at least one storage bin of the sliding drawer.

11. A vehicle interior assembly, comprising:
    a center console having front and rear terminal ends defining a longitudinal axis;
    a sliding portion slidingly engaging the rear terminal end of the console such that the sliding portion is operable to slide in frontward and rearward directions substantially parallel to the longitudinal axis of the console to cover and uncover at least one storage bin, wherein the sliding portion includes a first portion extending under the rear terminal end of the console and a second portion extending over the rear terminal end of the console to cover and uncover the at least one storage bin; and
    a sliding drawer disposed on a top surface of the console and operable to slide substantially in the forward and rearward directions to expose or hide the at least one storage bin.

12. The vehicle interior assembly according to claim 11, wherein the first portion of the sliding portion includes an upper surface and a lower surface, the upper surface including a tray.

13. The vehicle interior assembly according to claim 12, wherein the tray is integrally molded into the upper surface of the first portion.

14. The vehicle interior assembly according to claim 13, wherein:
    the tray is exposed when the sliding portion is slid in the rearward direction; and
    the tray is covered by the rear terminal end of the console when the sliding portion is slid in the frontward direction.

15. A vehicle interior assembly, comprising:
    a center console having front and rear terminal ends defining a longitudinal axis; and
    a sliding portion slidingly engaging the rear terminal end of the console such that the sliding portion is operable to slide in frontward and rearward directions substantially parallel to the longitudinal axis of the console to cover and uncover at least one storage bin, wherein:
    the sliding portion includes a first portion extending under the rear terminal end of the console and a second portion extending over the rear terminal end of the console to cover and uncover the at least one storage bin, and
    the first portion of the sliding portion includes an upper surface and a lower surface, the upper surface including a tray.

16. The vehicle interior assembly according to claim 15, wherein the tray is integrally molded into the upper surface of the first portion.

17. The vehicle interior assembly according to claim 15, wherein:
    the tray is exposed when the sliding portion is slid in the rearward direction; and
    the tray is covered by the rear terminal end of the console when the sliding portion is slid in the frontward direction.

\* \* \* \* \*